United States Patent
Shuck

(10) Patent No.: US 9,566,665 B2
(45) Date of Patent: Feb. 14, 2017

(54) VARIABLE WORKING DISTANCE FOR LASER DEPOSITION

(71) Applicant: Rolls-Royce Corporation, Indianapolis, IN (US)

(72) Inventor: Quinlan Y Shuck, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 398 days.

(21) Appl. No.: 14/099,601

(22) Filed: Dec. 6, 2013

(65) Prior Publication Data

US 2014/0263195 A1   Sep. 18, 2014

Related U.S. Application Data

(60) Provisional application No. 61/778,608, filed on Mar. 13, 2013.

(51) Int. Cl.
  *B23K 26/34* (2014.01)
  *B23K 15/00* (2006.01)
  *B23P 6/00* (2006.01)

(52) U.S. Cl.
  CPC ........ *B23K 26/345* (2013.01); *B23K 15/0086* (2013.01); *B23K 26/342* (2015.10); *B23K 2201/001* (2013.01); *B23P 6/007* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 5,043,548 A | * | 8/1991 | Whitney | B05B 7/228 219/121.47 |
| 5,160,822 A | * | 11/1992 | Aleshin | F01D 5/20 219/121.64 |
| 5,207,371 A | * | 5/1993 | Prinz | B22F 3/008 164/46 |
| 5,449,536 A | * | 9/1995 | Funkhouser | C23C 4/12 219/121.85 |
| 5,486,676 A | * | 1/1996 | Aleshin | B23K 26/144 219/121.63 |
| 5,837,960 A | * | 11/1998 | Lewis | B23K 26/34 219/121.63 |
| 6,046,426 A | * | 4/2000 | Jeantette | B01F 13/0255 219/121.63 |
| 6,410,105 B1 | * | 6/2002 | Mazumder | B23K 26/032 219/121.65 |
| 6,504,127 B1 | * | 1/2003 | McGregor | B23K 26/0604 219/121.63 |

(Continued)

OTHER PUBLICATIONS

International Search Report for PCT International Application Serial No. PCT/US2013/073551, completed May 8, 2014, (14 pages).

*Primary Examiner* — Quang D Thanh
*Assistant Examiner* — Renee Larose
(74) *Attorney, Agent, or Firm* — Barnes & Thornburg LLP

(57) ABSTRACT

A method of applying a laser metal formed build layer on a surface of an article is disclosed. A laser deposition head including a light source and a nozzle is positioned relative to the surface of the article by a distance that is about normal to the surface. The surface of the article is melted locally using the laser light source to form a melt pool. Powdered metal is injected into the melt pool using the nozzle. The melt pool is solidified to form the build layer having a desired microstructure on the surface of the article.

20 Claims, 1 Drawing Sheet

(56) References Cited

U.S. PATENT DOCUMENTS

| | | | |
|---|---|---|---|
| 6,605,795 B1 * | 8/2003 | Arcella | B23K 26/032 219/121.63 |
| 6,797,914 B2 * | 9/2004 | Speranza | B23K 26/244 219/121.64 |
| 7,045,738 B1 * | 5/2006 | Kovacevic | B05B 7/144 219/121.63 |
| 7,169,242 B2 * | 1/2007 | Fernihough | B22D 19/10 148/512 |
| 7,586,061 B2 * | 9/2009 | Hoebel | B23K 26/032 148/525 |
| 7,705,264 B2 * | 4/2010 | Hoebel | B23K 26/032 219/121.63 |
| 8,247,733 B2 | 8/2012 | Zhu | |
| 9,283,593 B2 * | 3/2016 | Bruck | B05D 3/06 |
| 2002/0065573 A1 * | 5/2002 | Mazumder | B23K 26/032 700/121 |
| 2004/0133298 A1 * | 7/2004 | Toyserkani | B23K 26/032 700/166 |
| 2006/0054079 A1 * | 3/2006 | Withey | C30B 29/02 117/108 |
| 2006/0081571 A1 * | 4/2006 | Hoebel | B23K 26/032 219/121.64 |
| 2007/0037509 A1 * | 2/2007 | Renz | B22F 3/003 454/354 |
| 2008/0178994 A1 * | 7/2008 | Qi | B22F 3/1055 156/245 |
| 2009/0057278 A1 * | 3/2009 | Nowotny | B23K 26/123 219/121.63 |
| 2010/0034647 A1 * | 2/2010 | Lee | B23K 26/34 415/177 |
| 2010/0086702 A1 * | 4/2010 | Blankenship | B23K 9/04 427/554 |
| 2010/0236067 A1 * | 9/2010 | Hu | B23K 9/044 29/889.1 |
| 2011/0103967 A1 * | 5/2011 | Hoebel | B23K 35/304 416/241 R |
| 2012/0181255 A1 * | 7/2012 | Bruck | B23K 9/324 219/73.2 |
| 2013/0309418 A1 * | 11/2013 | Lin | B23K 9/04 427/580 |

\* cited by examiner

VARIABLE WORKING DISTANCE FOR LASER DEPOSITION

CROSS REFERENCE TO RELATED APPLICATIONS

This application claims priority to and the benefit of U.S. Provisional Patent Application No. 61/778,608, filed 13 Mar. 2013, the disclosure of which is now incorporated herein by reference.

FIELD OF THE DISCLOSURE

The present disclosure relates generally to a method of applying a metal build layer to a surface of a workpiece using laser deposition and more specifically to a method of applying a metal build layer having a desired microstructure to a surface of a workpiece by using laser deposition to control a melt pool on the surface of the workpiece to produce the desired microstructure.

BACKGROUND

A component may become damaged over time due to erosion or impact by foreign object to the component. As a result, the damaged component may be repaired by adding material to the damaged component. In one example, the component may be a compressor blade, compressor vane, turbine blade, or turbine vane which has been damaged due to impact with a foreign object. Such blades or vanes may be repaired by adding layers of material to the damaged portion to rebuild the damage component. One method of repairing such damaged components is laser deposition or additive manufacturing.

Laser deposition is typically performed in layers at a fixed working distance between a laser head and a metal substrate of a workpiece. The laser head produces a melt pool in the metal substrate of a surface of the workpiece. Metal powder is then injected at a powder flow rate into the melt pool via a nozzle. The melt pool is cooled to produce a build layer having a specific microstructure.

As the thermal boundary conditions of the workpiece change, for example when the substrate geometry changes, it may become necessary to increase the powder flow rate to maintain the same cooling rate of the melt pools to produce the desired microstructure of the build layer. As an example, corners and edges of the workpiece may have less ability to act as a heat sink and, as such, may require an increased powder flow rate to prevent melt-back and improve draft angles.

However, fixed working distances are not able to maintain constant cooling rates in the laser deposition if the substrate geometry is changing. Increasing and/or decreasing powder flow rate would allow dynamic adjustment of the cooling rate of the melt pools. However, typically, the powder flow rate is adjusted at a powder feeder and the system response, as observed at the melt pool, is delayed by several seconds while the flow stabilizes. As such, powder flow rate has been typically a set and forget arrangement because it is not adequately adjustable within the timescales needed.

SUMMARY

The present application discloses one or more of the features recited in the appended claims and/or the following features which, alone or in any combination, may comprise patentable subject matter.

A method of applying a laser metal formed build layer on a surface of an article may include several operations. The method may comprise determining a first distance about normal to a first area of the surface of the article to space a laser deposition head relative to the first area of the surface such that a first melt pool produced at the first area of the surface is located in a first powder concentration area of a powdered-metal flow to produce a first melt-pool cooling rate. The laser deposition head may include a light source with a specific power and a nozzle configured to produce the powdered-metal flow with a first flow rate. The method may further include moving the laser deposition head including the light source and the nozzle relative to the first area of the surface of the article by the first distance about normal to the first area, melting locally the first area of the surface of the article using the laser light source with a specific power to form the first melt pool, injecting a powdered metal into the first melt pool at the first flow rate using the nozzle, and solidifying the first melt pool.

In some embodiments, the method may further comprise the step of determining a second distance about normal to a second area of the surface of the article to space the laser deposition head relative to the second area of the surface of the article such that a second melt pool produced at the second area of the surface is located in a second powder concentration area of a powdered-metal flow to produce the first melt-pool cooling rate. The nozzle may be configured to produce the powdered-metal flow with a second flow rate. The method may further include moving the laser deposition head including the light source and the nozzle relative to the second area of the surface of the article by the second distance about normal to the second area, melting locally the second area of the surface of the article using the laser light source with a specific power to form the second melt pool, injecting a powdered metal into the second melt pool at the second flow rate using the nozzle, and solidifying the second melt pool.

In some embodiments, the second flow rate of the powdered-metal flow may be equal to the first flow rate of the powdered-metal flow. In some embodiments, the second flow rate of the powdered-metal flow may not be equal to the first flow rate of the powdered-metal flow.

In some embodiments, the second area of the surface of the article may be spaced apart from the first area of the surface of the article. In some embodiments, the second distance may be greater than the first distance and the first powder concentration area has a first density and the second powder concentration area has a second density. In some embodiments, the second density may be greater than the first density.

In some embodiments, the second distance may be less than the first distance and the first powder concentration area has a first density and the second powder concentration area has a second density. In some embodiments, the second density may be less than the first density.

In some embodiments, moving the laser deposition head including the light source and the nozzle relative to the first area of the surface of the article by the first distance about normal to the first area and moving the laser deposition head including the light source and the nozzle relative to the second area of the surface of the article by the second distance about normal to the first area may be performed by moving the laser deposition head and keeping the article stationary. In some embodiments, moving the laser deposition head including the light source and the nozzle relative to the first area of the surface of the article by the first distance about normal to the first area and moving the laser deposition head including the light source and the nozzle relative to the second area of the surface of the article by the second distance about normal to the first area may be performed by moving the article and keeping the laser deposition head stationary.

In some embodiments, moving the laser deposition head from the first distance relative the first area of the surface of the article to the second distance relative the second area of the surface of the article may be performed in a continuous motion. In some embodiments, moving the laser deposition head from the first distance relative the first area of the surface of the article to the second distance relative the second area of the surface of the article may be performed in a series of discrete steps.

In some embodiments, the laser light may produce a laser spot with a first spot area and moving the laser deposition head from the first distance relative the first area of the surface of the article to the second distance relative the second area of the surface of the article results in a laser spot with a second spot area. In some embodiments, the second spot area may be equal to the first spot area.

In some embodiments, solidifying the first melt pool may result in a first build layer area having a first microstructure and solidifying the second melt pool may result in a second build layer area having a second microstructure. In some embodiments, the second microstructure may be about the same as the first microstructure.

These and other features of the present disclosure will become more apparent from the following description of the illustrative embodiments.

DETAILED DESCRIPTION OF THE DRAWINGS

Figure 1:
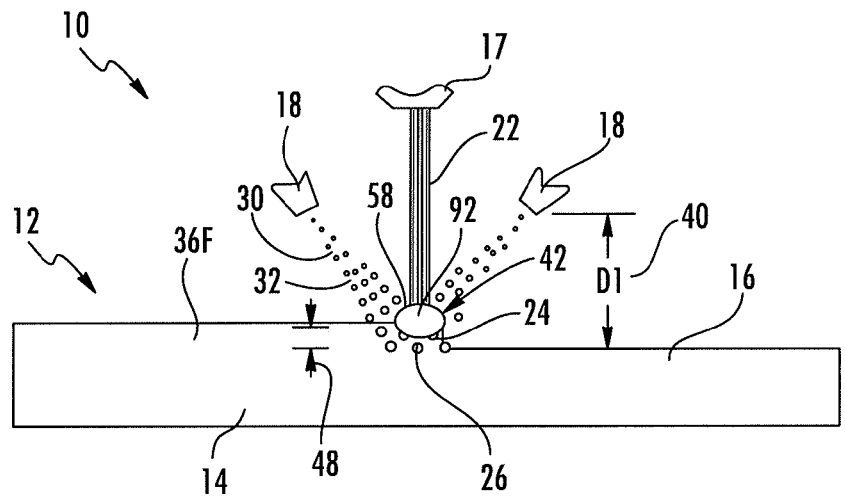
FIG. 1 is a side elevation view of a portion of a laser deposition process in accordance with the present disclosure showing a workpiece and a laser deposition head spaced apart from the workpiece by a first distance, the laser deposition head including a laser beam aimed at a surface of the workpiece to produce a melt pool on a metal substrate of the surface and a powdered metal feedstock to deposit metal into the melt pool, the laser deposition head is spaced apart from the workpiece by the first distance to produce the melt pool in a first powder concentration area having a first density, and a metal build layer having a first thickness remains on the surface after the melt pool cools.

For the purposes of promoting an understanding of the principles of the disclosure, reference will now be made to a number of illustrative embodiments illustrated in the drawings and specific language will be used to describe the same.

A laser deposition head 10 and a workpiece 12 in accordance with the present disclosure are shown in FIG. 1. The workpiece 12, also called article 12, may be, for example, a vane or blade of a gas turbine engine. The workpiece 12 includes a body 14 and a top surface 16 coupled to the body 14. The workpiece 12 may be formed from a variety of materials. For example, the workpiece 12 may be formed by a metal such as Inconel 718 or steel. In some embodiments, the body 14 and the top surface 16 are formed from the same material. In some embodiments, the body 14 and the top surface 16 are formed from different materials. In the illustrative embodiment, the body 14 and the top surface 16 of the workpiece 12 are formed from Inconel 718.

The laser deposition head 10 includes a light source 14 and at least one nozzle 18. In the illustrative embodiment, the light source 17 is a laser. The light source 17 has a variable power. In the illustrative embodiment, the power is a specific power and remains substantially constant during the laser deposition process. The light source 17 directs a beam of light 22 at the top surface 16 of the workpiece 12 to heat and melt, locally, an area 24 of the top surface 16 to produce a melt pool 26.

The nozzle 18 is connected to a powder feeder containing powdered metal 30. The nozzle 18 sprays a powdered-metal flow 32 containing the powdered metal 30 at a flow rate. The powdered-metal flow 32 may have a variable flow rate. In the illustrative embodiment, the flow rate is constant. The nozzle 18 is oriented such that the powdered-metal flow 32 sprays towards the beam of light 22 and the melt pool 26 as shown in FIG. 1. As such, the powdered metal 30 from the nozzle 18 is injected into the melt pool 26. The laser deposition head 10 is moved away from the area 24 and the melt pool 26 is allowed to cool. As the melt pool 26 cools, a build layer 36 develops on the top surface 16 due to the injected powdered metal 30.

A portion of a laser deposition process in accordance with the present disclosure includes the workpiece 12 and the laser deposition head 10 spaced apart from workpiece 12 by a first distance 40 in an about normal direction as shown in FIG. 1. The laser deposition head 10 includes the light source 17 that produces the beam of light 22. The beam of light 22 is aimed at a first area 24 of the top surface 16 to produce a first melt pool 26. The beam of light 22 produces a laser spot 90 having a first spot area.

The nozzle 18 injects the powdered metal 30 into the first melt pool 26. The laser deposition head 10 is spaced apart from the workpiece 12 by the first distance 40 to produce the first melt pool 26 and locate the first melt pool 26 in a first powder concentration area 42 of the powdered-metal flow 32 having a first density. In some embodiments, the laser deposition head 10 is spaced apart from the workpiece 12 by the first distance 40 by moving the laser deposition head 10 and keeping the workpiece 12 stationary. In some embodiments, laser deposition head 10 is spaced apart from workpiece 12 by the first distance 40 by moving the workpiece 12 and keeping the laser deposition head 10 stationary.

By locating the first melt pool 26 in a first powder concentration area 42 of the powdered-metal flow 32, a desired amount of the powdered metal 30 is injected into the first melt pool 26. The desired amount of the powdered metal 30 injected into the first melt pool 26 causes the first melt pool 26 to have a first cooling rate. The first melt pool 26 cools and a first build layer 36F develops on the top surface 16. The first build layer 36F has a first thickness 48 and a first microstructure 50.

The laser deposition head 10 is moved in a direction about parallel relative the top surface 16 to a second area 52 of the top surface 16 to develop a second build layer 36S. In some embodiments, the laser deposition head 10 is moved from the first area 24 to the second area 52 in a continuous motion. In some embodiments, the laser deposition head 10 is moved from the first area 24 to the second area 52 in discrete steps. In some embodiments, the second area 52 is spaced apart from the first area 24. In some embodiments, the second area 52 is equal to the first area 24.

The laser deposition head 10 is spaced apart from the workpiece 12 by a second distance 54 about normal to the second area 52 to cause the beam of light 22 to produce a second melt pool 56 on the top surface 16 at the second area 52. The second distance 54 is greater than the first distance 40. In some embodiments, the laser deposition head 10 is spaced apart from the workpiece 12 by the second distance 54 by moving the laser deposition head 10 and keeping the workpiece 12 stationary. In some embodiments, the laser deposition head 10 is spaced apart from the workpiece 12 by the second distance 54 by moving the workpiece 12 and keeping laser deposition head 10 stationary.

Moving the laser deposition head 10 from the first distance 40 to the second distance 54 results in a laser spot with a second spot area 94. In some embodiments, the second spot area 94 is equal to the first spot area 92.

Figure 2:
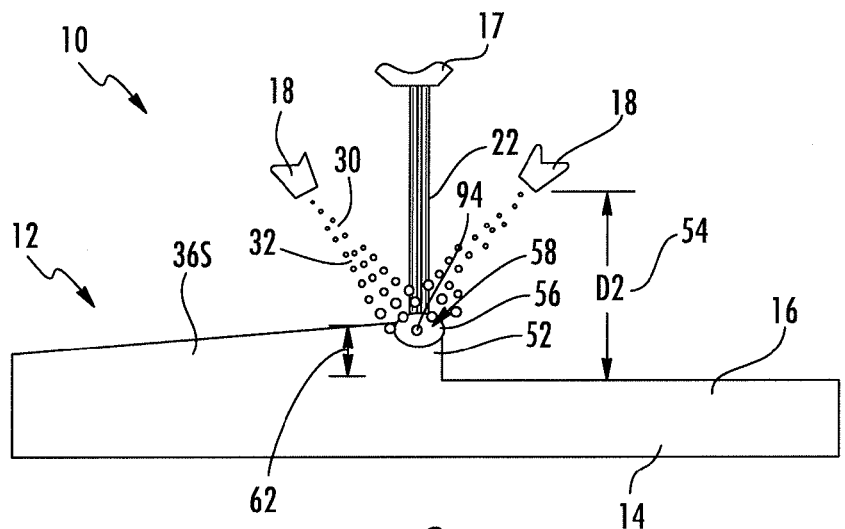
FIG. 2 is a view similar to FIG. 1 showing the laser deposition head spaced apart from the workpiece by a second distance to cause the laser beam included in the laser deposition head to produce a melt pool on the metal substrate of the surface in a second powder concentration area, the second distance being greater than the first distance, the second powder concentration area having a greater density than the density of the first powder concentration area such that more metal powder is captured in the melt pool and a second metal build layer remains on the surface after the melt pool cools, the second metal build layer having a greater thickness than the first metal build layer.

The laser deposition head 10 is spaced apart from the workpiece 12 by the second distance 54 to produce the second melt pool 56 and locate the second melt pool 56 in a second powder concentration area 58 of the powdered-metal flow 32 having a second density as shown in FIG. 2. In some embodiments, the second density of the second powder concentration area 58 is not equal to the first density of the first powder concentration area 42. In the illustrative embodiment, the second density is greater than the first density. The second powder concentration area 58 has the second density greater than the first density of the first powder concentration area 42 such that more powdered metal 30 is captured in the second melt pool 56 than the first melt pool 26.

The amount of powdered metal 30 injected into the second melt pool 56 causes the second melt pool 56 to have a second cooling rate. The second melt pool 56 cools at the second cooling rate and the second build layer 36S develops on the top surface 16 at the second area 52. In some embodiments, the second cooling rate 66 is equal to the first cooling rate.

The second build layer 36S has a second thickness 62 and a second microstructure 68. In some embodiments, the second thickness 62 is equal to the first thickness 48. In some embodiments, the second microstructure 68 is equal to the first microstructure 50. In the illustrative embodiment, the second thickness 62 is greater than the first thickness 48 and the second microstructure 68 is equal to the first microstructure 50.

The laser deposition head 10 is moved in a direction about parallel relative to the top surface 16 to a third area 70 of the top surface 16, to develop a third build layer 36T. In some embodiments, the laser deposition head 10 is moved from the first area 24 to the third area 70 in a continuous motion. In some embodiments, the laser deposition head 10 is moved from the first area 24 to the third area 70 in discrete steps. In some embodiments, the third area 70 is spaced apart from the first area 24. In some embodiments, the third area 70 is equal to the first area 24.

Figure 3:
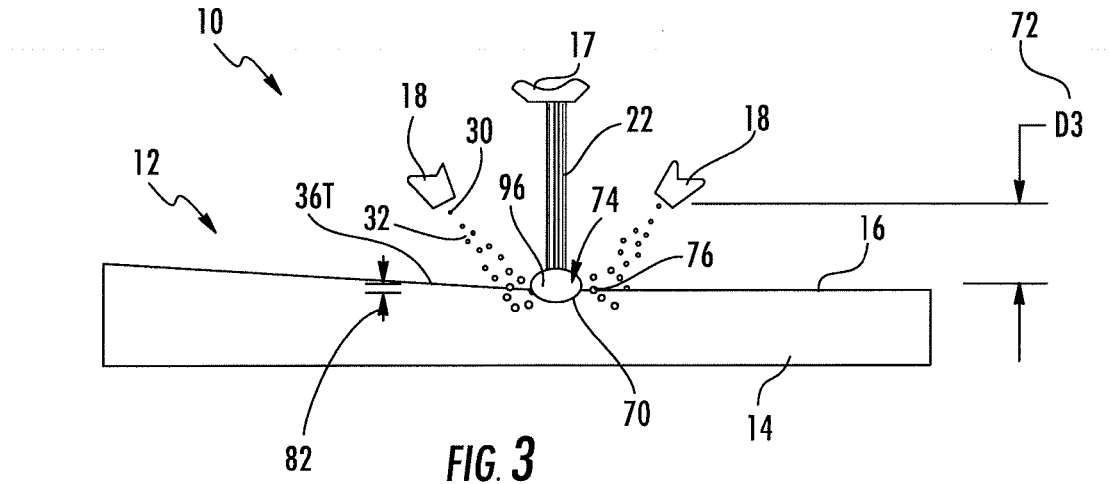
FIG. 3 is a view similar to FIG. 2 showing the laser deposition head spaced apart from the workpiece by a third distance to cause the laser beam included in the laser deposition head to produce a melt pool on the metal substrate of the surface in a third powder concentration area, the third distance being less than the first distance, the third powder concentration area having a density that is less than density of the first powder concentration area such that less metal powder is captured in the melt pool and a third metal build layer remains on the surface after the melt pool cools, the third metal build layer having a thickness less than the first metal build layer.

The laser deposition head 10 is spaced apart from workpiece 12 by a third distance 72 about normal to the third area 70 to cause the beam of light 22 to produce a third melt pool 74 on the top surface 16 at the third area 70 as shown in FIG. 3. In some embodiments, the laser deposition head 10 is spaced apart from the workpiece 12 by the third distance 72 by moving the laser deposition head 10 and keeping the workpiece 12 stationary. In some embodiments, the laser deposition head 10 is spaced apart from the workpiece 12 by the third distance 72 by moving the workpiece 12 and keeping the laser deposition head 10 stationary. The third distance 72 is less than the first distance 40 as shown in FIG. 3.

Moving the laser deposition head 10 from the first distance 40 to the third distance 72 results in a laser spot with a third spot area 96. In some embodiments, the third spot area 96 is equal to the first spot area 92.

The laser deposition head 10 is spaced apart from the workpiece 12 by the third distance 72 to produce the third melt pool 74 and locate the third melt pool 74 in a third powder concentration area 76 of the powdered-metal flow 32 having a third density 78 as shown in FIG. 3. In some embodiments, the third density of the third powder concentration area 76 is not equal to the first density of the first powder-concentration area 42. In the illustrative embodiment, the third density 78 is less than the first density. The third powder concentration area 76 has the third density less than the first density of the first powder concentration area 42 such that less powdered metal 30 is captured in the third melt pool 74 than the first melt pool 26.

The amount of powdered metal 30 injected into the third melt pool 74 causes the third melt pool 74 to have a third cooling rate. The third melt pool 74 cools at the third cooling rate and the third build layer 36T develops on the top surface 16 at the third area 70. In some embodiments, the third cooling rate is equal to the first cooling rate. The third build layer 36T has a third thickness 82 and a third microstructure 84. In some embodiments, the third thickness 82 is equal to the first thickness 48. In some embodiments, the third microstructure 84 is equal to the first microstructure 50. In the illustrative embodiment, the third thickness 82 is less than the first thickness 48 and the third microstructure 84 is equal to the first microstructure 50.

In some embodiments, the flow rate 34 of the powdered-metal flow 32 is varied during the process. The distances 40, 54, and 72 are determined based upon at least the flow rate of powdered-metal flow 32 to produce the desired thicknesses 48, 62, and 82, cooling rates, and, and/or microstructures 50, 68, and 84.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. A method of applying a laser metal formed build layer on a surface of an article, the method comprising the operations of
determining a first distance between a laser deposition head and a first area of a surface included in an article to cause a first melt pool having a first melt-pool cooling rate to be provided, moving the laser deposition head including a light source and a nozzle relative to the article to establish the first distance, melting the first area using the light source of the laser deposition head to establish the first melt pool, and injecting powdered metal into the first area at a first flow rate using the nozzle, and solidifying the first melt pool, determining a second distance between the laser deposition head and a second area of the surface of the article that causes a second melt pool having the first melt-pool cooling rate moving the laser deposition head relative to the article to establish the second distance, melting the second area using the light source of the laser deposition head to establish the second melt pool, wherein the laser deposition head is moved from the first distance to the second distance in a continuous motion.

2. The method of claim 1, further comprising injecting powdered metal into the first area at a second flow rate using the nozzle, and solidifying the second melt pool.

3. The method of claim 2, wherein the second flow rate is equal to the first flow rate.

4. The method of claim 2, wherein the second flow rate is different than the first flow rate.

5. The method of claim 2, wherein the second distance is greater than the first distance, a first powder concentration area has a first density, and a second powder concentration area has a second density.

6. The method of claim 5, wherein the second density is greater than the first density.

7. The method of claim 2, wherein the second distance is less than the first distance, a first powder concentration area has a first density, and the second powder concentration area has a second density.

8. The method of claim 7, wherein the second density is less than the first density.

9. The method of claim 2, wherein the second area of the surface of the article is spaced apart from the first area of the surface of the article.

10. The method of claim 1, wherein the article is kept in a fixed position relative to the laser deposition head during movement of the laser deposition head.

11. The method of claim 2, wherein the laser light produces a laser spot with a first spot area and moving the laser deposition head from the first distance relative the first area of the surface of the article to the second distance relative the second area of the surface of the article results in a laser spot with a second spot area.

12. The method of claim 11, wherein the second spot area is equal to the first spot area.

13. The method of claim 11, wherein the second spot area is larger than the first spot area.

14. The method of claim 2, wherein solidifying the first melt pool results in a first build layer area having a first microstructure and solidifying the second melt pool results in a second build layer area having a second microstructure.

15. The method of claim 2, wherein the second microstructure is the same as the first microstructure.

16. A method of applying a laser metal formed build layer on a surface of an article, the method comprising the operations of determining a first distance normal to a first area of the surface of the article to space a laser deposition head relative to the first area of the surface such that a first melt pool produced at the first area of the surface is located in a first powder concentration area of a powdered-metal flow to produce a first melt-pool cooling rate, the laser deposition head including a light source with a specific power and a nozzle configured to provide the powdered-metal flow with a first flow rate, moving the laser deposition head including the light source and the nozzle relative to the first area of the surface of the article by the first distance normal to the first area, melting locally the first area of the surface of the article using the laser light source with a specific power to form the first melt pool, injecting a powdered metal into the first melt pool at the first flow rate using the nozzle, solidifying the first melt pool, determining a second distance normal to a second area of the surface of the article to space the laser deposition head relative to the second area of the surface of the article such that a second melt pool produced at the second area of the surface is located in a second powder concentration area of a powdered-metal flow to produce the first melt-pool cooling rate, the nozzle configured to provide the powdered-metal flow with a second flow rate, moving the laser deposition head including the light source and the nozzle relative to the second area of the surface of the article by the second distance normal to the second area, melting locally the second area of the surface of the article using the laser light source with a specific power to form the second melt pool, injecting a powdered metal into the second melt pool at the second flow rate using the nozzle, and solidifying the second melt pool, wherein the laser deposition head is moved from the first distance to the second distance in a continuous motion.

17. A method of applying a laser metal formed build layer on a surface of an article, the method comprising the operations of determining a first distance between a laser deposition head and a first area of a surface included in an article to cause a first melt pool having a first melt-pool cooling rate to be provided, moving the article relative to the laser deposition head including a light source and a nozzle to establish the first distance, melting the first area using the light source of the laser deposition head to establish the first melt pool, and injecting powdered metal into the first area at a first flow rate using the nozzle, and solidifying the first melt pool, determining a second distance between the laser deposition head and a second area of the surface of the article to cause a second melt pool having the first melt-pool cooling rate, moving the article relative to the laser deposition head to establish the second distance, melting the second area using the light source of the laser deposition head to establish the second melt pool, wherein the article is moved from the first distance to the second distance in a continuous motion.

18. The method of claim 17, further injecting powdered metal into the first area at a second flow rate using the nozzle, and solidifying the second melt pool.

19. The method of claim 1, wherein a portion of the first melt pool overlaps a portion of the second melt pool.

20. The method of claim 1, wherein the second melt pool is spaced apart from and separate from the first melt pool.

* * * * *